(12) United States Patent
Sunde et al.

(10) Patent No.: US 6,758,270 B1
(45) Date of Patent: Jul. 6, 2004

(54) METHOD OF MICROBIAL ENHANCED OIL RECOVERY

(75) Inventors: Egil Sunde, Sandnes (NO); Terje Torsvik, Bones (NO)

(73) Assignee: Statoil ASA, Stavanger (NO)

(*) Notice: Subject to any disclaimer, the term of this patent is extended or adjusted under 35 U.S.C. 154(b) by 0 days.

(21) Appl. No.: 10/129,395
(22) PCT Filed: Nov. 3, 2000
(86) PCT No.: PCT/GB00/04239
§ 371 (c)(1), (2), (4) Date: Sep. 17, 2002
(87) PCT Pub. No.: WO01/33040
PCT Pub. Date: May 10, 2001

(30) Foreign Application Priority Data

Nov. 4, 1999 (GB) .............................................. 9926157

(51) Int. Cl.$^7$ .............................................. E21B 43/22
(52) U.S. Cl. ........................ 166/246; 166/275; 166/279; 166/300; 166/305.1
(58) Field of Search ................................. 166/246, 263, 166/268, 270.1, 275, 279, 300, 305.1, 310

(56) References Cited

U.S. PATENT DOCUMENTS

| | | |
|---|---|---|
| 2,907,389 A | 10/1959 | Hitzman |
| 3,332,487 A | 7/1967 | Jones |
| 4,678,033 A | 7/1987 | Killough |
| 4,905,761 A | 3/1990 | Bryant |
| 5,083,611 A | 1/1992 | Clark ........................ 166/246 |
| 5,163,510 A | * 11/1992 | Sunde ........................ 166/246 |
| 5,360,064 A | * 11/1994 | Jenneman et al. .......... 166/246 |
| 5,753,122 A | * 5/1998 | Taylor et al. ................ 210/611 |

FOREIGN PATENT DOCUMENTS

| | | |
|---|---|---|
| WO | 89/10463 | 11/1989 |
| WO | 92/13172 | 8/1992 |

OTHER PUBLICATIONS

Search Report—PCT/GB00/04239, Jan., 2001.
Preliminary Examination Report—PCT/GB00/04239. Jan., 2002.

* cited by examiner

*Primary Examiner*—Zakiya Walker
(74) *Attorney, Agent, or Firm*—Patterson, Thuente, Skaar & Christensen, P.A.

(57) ABSTRACT

A method of microbial enhanced oil recovery for recovering oil from an oil-bearing rock formation (13). The method comprises: injecting water containing a source of vitamins, phosphates and an electron acceptor such as nitrate into the formation at first location (10) and allowing anaerobic bacteria, which are either already present in the formation (13) or which are introduced simultaneously to multiply using the oil as their main carbon source. This establishes a biomass layer (16) which acts to dissociate the oil from the rock formation (13). The dissociated oil is removed via an outlet (15).

47 Claims, 1 Drawing Sheet

METHOD OF MICROBIAL ENHANCED OIL RECOVERY

FIELD OF THE INVENTION

The present invention relates to a method of microbial enhanced oil recovery.

BACKGROUND OF THE INVENTION

When oil is present in subterranean rock formations such as sandstone or chalk, it can generally be exploited by drilling into the oil-bearing measures and allowing existing overpressures to force the oil up the borehole. This is known as primary removal. When the overpressure approaches depletion, it is customary to create an overpressure, for example by injecting water into the formations to flush out standing oil. This is known as secondary removal.

However, even after secondary removal, a great deal of oil remains in the formations; in the case of North Sea oil, this may represent up to 75% of the original oil present Of this remaining oil probably more than half will be in the form of droplets and channels adhering to the rock formations that have been water-flooded and the remainder will be in pockets which are cut off from the outlets from the field. The present invention is concerned with the exploitation of the accessible but adhering oil remaining in the rock formations.

A number of enhanced oil recovery methods have been proposed, to address this objective. One approach is to combine pressure with a change in viscosity of the oil and/or water present. Thus, a diluent or $CO_2$ or steam is added to the reservoir to reduce the viscosity of the oil, thereby allowing it to be freed. Alternatively, viscosity-increasing additions such as polymers may be added to the injection water so that the oil is preferentially dislodged. However, the application of $CO_2$ is disadvantageous due to scale formation, the use of steam is only effective in shallow reservoirs of low temperature while the other additives are very costly.

Another approach is to alter the surface tension and capillary forces so that the water under pressure is more accessible to the pores and channels. This may be achieved by alkaline flooding or by means of surfactants. However, these approaches also tend to be costly.

Another approach is in situ combustion. This entails pumping air or oxygen into the formation and igniting the gas/oil present. In theory, the heat produced will mobilise the lighter fractions as a combustion front moves steadily through the formation, with the heavier tars burning. In practice, however, it is almost impossible to control the progress since the gases tend to rise while the water present sinks, resulting in an uneven combustion front.

A fourth approach is microbial enhanced oil recovery (MEOR). This entails the use of micro-organisms such as bacteria to dislodge the oil, and a number of systems have been proposed. In the case of unconsolidated measures, such as oil shales, the oil bearing rock may be pumped as an aqueous slurry to surface settling tanks or reservoirs where it is subjected to aerobic bacteria, as disclosed in U.S. Pat. No. 2,907,389. The availability of oxygen allows the bacteria to multiply, using the oil as a carbon source. In so doing, the bacteria produce surfactants which act to free the oil as droplets. The droplets of oil are less dense than water and so float to the surface. The oil is then removed. Unfortunately, the system cannot conveniently be applied to consolidated rock formations, particularly when they are undersea.

In situ MEOR methods generally fall into two categories, aerobic bacteria systems, as described typically in U.S. Pat. No. 3,332,487 and anaerobic bacteria systems as described in WO 89/10463.

The very existence of oil in a formation means that there cannot be present any anaerobic bacteria which will feed on oil under the prevailing conditions. Thus, in anaerobic bacteria systems, it has been assumed that a source of carbon or "food" must be supplied. However, under these circumstances, the bacteria selected (either deliberately or naturally) will be those most suited under the prevailing conditions to the consumption of the particular food employed. They will not be specifically adapted to have an effect on oil and therefore their action on oil will be as it were a by-product and these anaerobic systems therefore tend to be very slow in achieving the desired liberation of oil.

The absence of any oxygen in oil bearing formations means that if an aerobic system is to be used, then oxygen must be supplied. However, when aerobic bacteria are used and oxygen (or air, containing oxygen) is injected into the formation, the situation is far from satisfactory. Firstly, there is an immediate separation into a gaseous and an aqueous phase, which makes control of the system very difficult and in practice, limits the system to a batch-type operation. Secondly, a great deal of heat is generated, which, in view of the oxygen-rich gaseous phase and the readily available combustible material, presents a considerable risk of explosion. A cooling medium must therefore also be employed.

One way of addressing this is described in WO 92/13172. This reference describes a method of microbial enhanced oil recovery for recovering oil from an oil-bearing second rock formation, the formation including an inlet at a first location and an outlet at a second location, the method comprising: injecting water containing a source of oxygen, capable of yielding at least 5 mg/l free oxygen, into the formation at the first location spaced apart from the second location, allowing micro-organisms, which are either already present in the formation or which are introduced simultaneously with the oxygen containing injection water to multiply using the oil as their main carbon source and the oxygen from the injection water as their main oxygen source thereby establishing a biomass layer which acts to dissociate the oil from the rock formation, the dissociated oil then being removed via the outlet by the injection water.

In this system, on the far side of the injection well, the oxygen becomes the growth limiting factor due to the consumption of oxygen by the micro-organisms. The rate of growth of micro-organisms is of course dependent on the available oxygen. In this system maximum growth is desired and therefore it is desirable to maintain a high oxygen concentration in the injection water (and clearly also in advancing biomass layer). Field trials in Austria in recent years have shown that by the use of this system, it has been possible to obtain a threefold increase in oil production.

However it has been found that this system is effective over only a relatively short distance from the point of oxygen injection. Furthermore, it would be desirable to avoid the use of injected oxygen in order to avoid problems of corrosion. This is particularly acute in situations where the equipment susceptible of corrosion is remote and/or difficult and costly to replace.

It is known that sulphate reducing bacteria (SRB), nitrate reducing bacteria (NRB), iron-reducing bacteria (IRB) and acetogenic bacteria can grow anaerobically on oil if they have the necessary inorganic nutrients. Laboratory studies have shown that oxygen can be substituted by certain growth factors e.g. vitamins in order to achieve a reduction in residual oil concentration.

SUMMARY OF THE INVENTION

It is therefore an object of the present invention to produce oil by a method of microbial enhanced oil recovery which preferably avoids the use of injected oxygen. It is a further object of the invention to provide a method of microbial enhanced oil recovery which is effective over greater distances.

According to the invention, there is provided a method of microbial enhanced oil recovery for recovering oil from an oil-bearing rock formation, the formation including an inlet and an outlet, the method comprising: injecting water containing a source of vitamins, phosphates and an electron acceptor into the formation, allowing micro-organisms in the form of anaerobic or facultative anaerobic bacteria, which are either already present in the formation or which are introduced simultaneously with the vitamins, phosphates and electron acceptor to multiply using the oil as their main carbon source thereby establishing a biomass layer which acts to dissociate the oil from the rock formation; and removing the dissociated oil via the outlet.

Preferably, the electron donor is nitrate added as calcium, potassium, sodium or ammonium salt though sulphates could be employed. Preferably, the inlet is at a first location and the outlet is at a second location spaced apart from the first location, though the inlet and outlet could be one and the same, e.g. the production well. Preferably, substantially no oxygen is supplied with the injection water.

The bacteria are oil degrading anaerobic and/or facultative anaerobic bacteria. Preferably, the bacteria substantially comprise species of SRB, NRB, IRB and/or acetogenic bacteria. Preferably, the vitamins comprise one or more or a blend of: B12, biotin, folic acid, nicotinic acid, ammnobenzoic acid, calcium pantothenate, pyridoxine HCL, riboflavin, Thiamine and Thioctic acid. The vitamins etc. are preferably introduce continuously into the formation. Alternatively, they may be introduced periodically for example once per day.

Preferably, the individual concentration of the vitamins in the injection water is in the range of 1 to 1000 $\mu$g/l and more preferably in the range of 10 to 100 $\mu$g/l. Preferably, the superficial velocity of the injection water through the oil-bearing formation is between 0.1 and 15 m/day, more preferably between 0.3 and 2 n/day.

As the displaced oil is washed forwards, the micro-organisms at the rear of the front will have no oil and will either become dormant or will feed on each other. This effectively regulates the thickness of the biomass layer ensuring that the vitamins, phosphates and the electron acceptor penetrate to the forward part of the layer, allowing fresh oil to be acted upon. Thus, the front advances through the oil towards the outlet and dislodged oil is constantly being flushed out by the injection water.

By a process of natural selection, only the most successful micro-organisms thrive and these will be the ones most effective in using the oil. They will therefore be the most efficient at dislodging the oil, probably by the production of surfactants. However, due to the flushing action of the injection water, the displaced oil is removed and so only a very small proportion of the oil will actually be consumed by the biomass.

One theory as to how the oil is dissociated is that the oil is split into small droplets by the surfactants and these are washed out. However, the present applicants believe that the oil is initially disposed in long strands or ribbons in the rock pore structure and that the surfactants begin to affect only portions of these strands. In this way, the overall viscous forces attaching a strand will be reduced and the injection water pressure eventually dislodges the entire strand, rather than its being broken up by the surfactants.

The micro-organisms may be any convenient anaerobic and/or facultative anaerobic bacteria. Suitable bacteria may be SRB, NRB, IRB and acetogenic bacteria. The bacteria used may be pre-selected and cultivated to thrive in the injection water under the prevailing conditions.

Examples of suitable nitrates and phosphates include $NaNO_3$, $KNO_3$, $NH_4NO_3$, $Ca(NO_3)_2$, $Na_2HPO_4$, and $K_2HPO_4$. If sulphates are relied upon, these would be naturally present in sea water.

It will be appreciated that by using a system according to the invention, the advancing biomass layer may remove efficiently all the oil it encounters. Either the oil will be dislodged and flushed away or it will be consumed and converted though some may remain. The liberated oil can be separated from the water, minerals and organic material by conventional methods though it is desirable to minimise any pre-separation exposure to air in order to avoid further microbial action on the oil.

BRIEF DESCRIPTION OF THE DRAWINGS

The invention may be carried into practice in various ways and an embodiment will now be described by way of example with reference to the accompanying drawings in which.

DETAILED DESCRIPTION OF THE PREFERRED EMBODIMENTS

Figure 1:
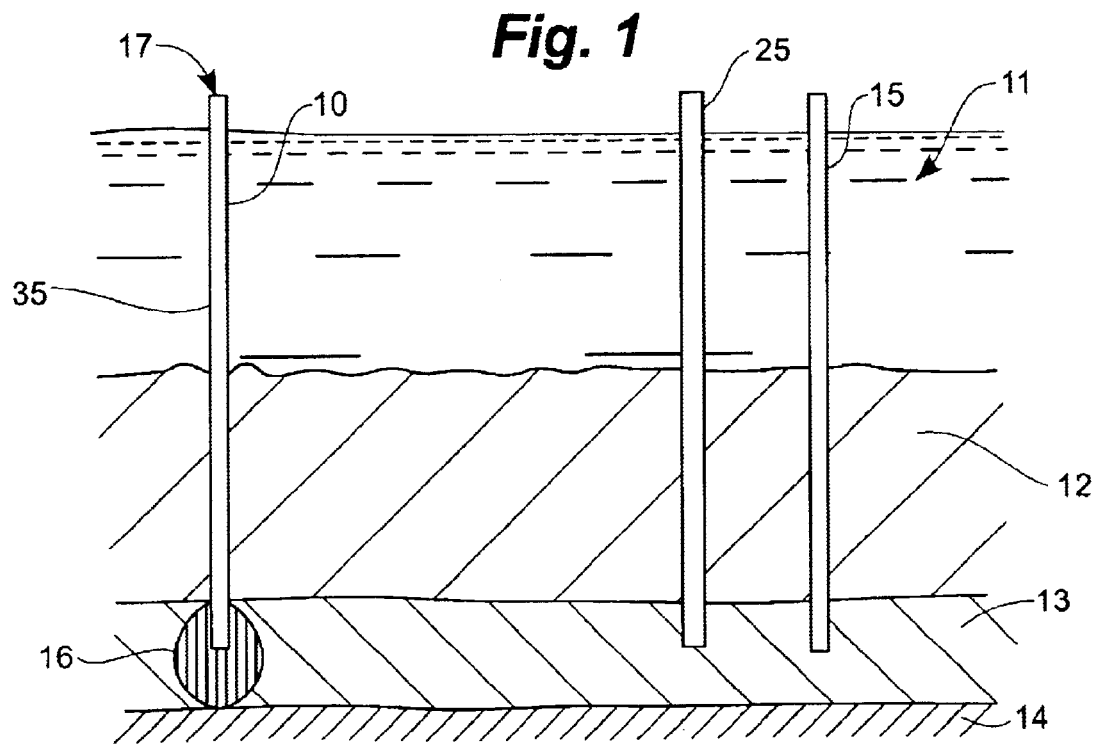
FIG. 1 is a schematic vertical section showing the initiation of a method according to the invention in a residual oil-bearing formation.

FIG. 1 shows an undersea oil well which has been subjected to primary/secondary removal by means of an injection well 10. Beneath the sea 11 there are various core strata 12, a residual oil being formation 13 and an underling bed rock 14. Producing boreholes 15, 25 the injection borehole 10 extend into the formation 13. In the case of a North Sea oilfield such as the Gullfaks field, the formation 13 might be consolidated sandstone which has a large quantity of adhering oil and which is flooded with formation and injection water containing no oxygen.

Injection water 17 is introduced into the formation 13 via the injection well 10. If there are no suitable anaerobic bacteria present in the formation 13 either naturally or due to operations carried out previously, anaerobic bacteria will be introduced via the injection well 10 e.g. with the injection water 17. The injection water 17 contains vitamins, and mineral nutrients comprising nitrates and phosphates, but substantially no oxygen.

When the vitamins and minerals in the injection water 17, the bacteria and the oil come into mutual contact, the bacteria attacks the oil, and multiplies, creating biofilm 16 converting some of the oil to lighter fractions and producing surface active agents or surfactants. The production well 15, 25 act as a sink and there will be an overall flow of bioorganic matter (biofilm) produced by the micro-organisms, oil and injection/formation water from the injection well 10 towards the production wells 15, 25. Alternatively, injection well 10 may also be used as a production well, e.g., see 35.

The injection water 17 is moving through the formation 13 towards the boreholes 152 at a speed of about 0.1–15 m/day carrying the formation/injection water before it. The formation water is removed via the boreholes 15, 25. The surfactants produced by the biofilm 16 help to reduce the forces by which the oil is attached to the rock formation and so the flowing injection water 17 actually detaches the oil 18 and this is carried forward through the formation 15, 25.

As the injection water 17 passes through the biofilm 16, the vitamins and minerals are consumed by the multiplying bacteria and the oil is partly consumed but largely detached and carried forward by the injection water. The bacteria at the forward end of the layer encounter adhering oil and so multiply detaching the oil. However, the bacteria at the rear run out of food (oil) and so they die. In this way, the bacteria layer moves steadily through the formation 13 at a rate of about 0.1 to 15 m/day.

Figure 3:
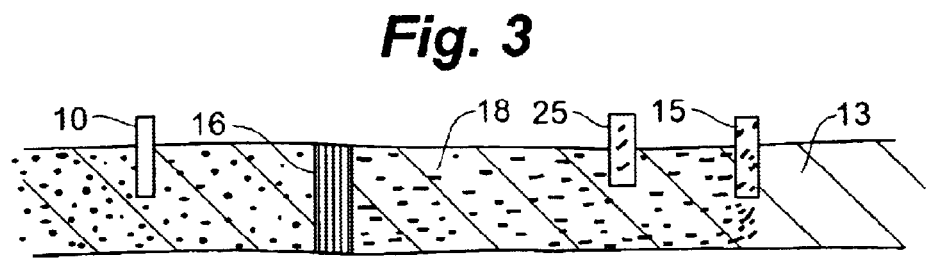

As shown in FIG. 3, the detached oil 18 flows out into the boreholes 15, 25 with the injection water. This is recovered at the surface and separation is carried out in a known matter.

Figure 4:
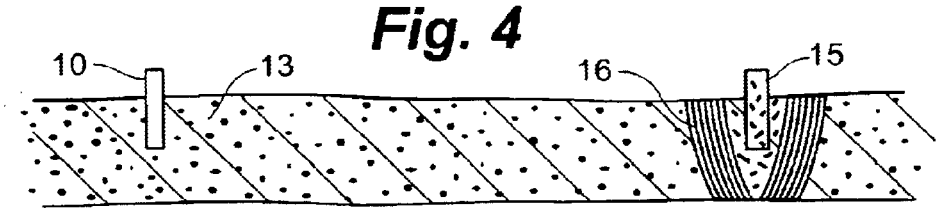

Eventually, the biofilm 16 reaches the borehole 15 and the well is shut down as shown in FIG. 4. The formation 13 will then be depleted of the oil previously adhering there.

Figure 2:
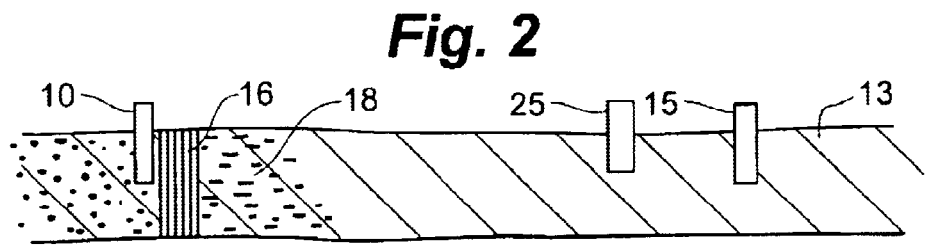
FIGS. 2 to 4 are similar simplified views showing sequential steps in the process.

While FIGS. 1 to 3 shown the effect of the invention in one dimension, it will be appreciated that in practice, the situation would be a good deal more complex. In particular, the bacteria 16 would be arranged to converge on e.g. the borehole 15 from many or all directions, as depicted schematically in FIG. 4. Furthermore, there would probably be a number of boreholes, which would be in use simultaneously.

What is claimed is:

1. A method of microbial enhanced oil recovery for recovering oil from an oil-bearing rock formation, the formation including an inlet and at least one outlet, the method comprising:
   infecting water containing a source of vitamins, phosphates and an electron acceptor into the formation;
   allowing micro-organisms selected from the group consisting of anaerobic and facultative anaerobic bacteria to multiply using the oil as their main carbon source, thereby establishing a biomass layer which acts to dissociate the oil from the rock formation; and
   removing the dissociated oil via the at least one outlet;
   wherein the micro-organisms substantially comprise species selected from the group consisting of sulphate-reducing bacteria, nitrate-reducing bacteria, iron-reducing bacteria, acetogenic bacteria, and combinations of these.

2. A method as claimed in claim 1, in which the microorganisms are already present in the formation.

3. A method as claimed in claim 1, in which the microorganisms are introduced simultaneously with the vitamins, phosphates and electron acceptor.

4. A method as claimed in claim 1, in which the electron acceptor is nitrate.

5. A method as claimed in claim 1, in which the inlet is at a first location and the outlet is at a second location spaced apart from the first location.

6. A method as claimed in claim 1, in which the inlet and outlet are one and the same.

7. A method as claimed in claim 1, in which substantially no oxygen is supplied with the injection water.

8. A method as claimed in claim 1, in which the source of vitamins comprises vitamins selected from the group consisting of B12, biotin, folic acid, nicotinic acid, aminobenzoic acid, calcium pantothenate, pyridoxine HCL, riboflavin, thiamine and thioctic acid.

9. A method as claimed in claim 1, in which the source of vitamins is introduced into the formation continuously.

10. A method as claimed in claim 1, in which the concentration of the source of vitamins in the injection water is in the range of 1 to 1000 $\mu g/l$.

11. A method as claimed in claim 1, in which the superficial velocity of the injection water through the oil-bearing formation is between 0.1 and 15 m/day.

12. A method as claimed in claim 1, in which the microorganisms produce surfactants which act to dislodge the oil.

13. A method as claimed in claim 1, applied to more than one outlet from the oil-bearing formation.

14. A method of microbial enhanced oil recovery for recovering oil from an oil bearing rock formation, the method comprising:
    a step for supplying a substance for promoting microbial growth to the formation;
    a step for creating a biomass layer in the formation for dissociating oil from the formation; and
    a step for removing the dissociated oil from the formation, wherein the substance for promoting microbial growth comprises water, a source of vitamins, a source of phosphates, and an electron acceptor; and
    wherein the source of vitamins comprises at least one vitamin selected from the group consisting of B12, biotin, folic acid, nicotinic acid, aminobenzoic acid, calcium pantothenate, pyridoxine HCL, riboflavin, thiamine, and thioctic acid.

15. The method of claim 14, wherein the step for supplying a substance for promoting microbial growth to the formation comprises injecting the substance at an inlet to the formation.

16. The method of claim 15, wherein the superficial velocity of the substance through the formation is in the range from 0.1 to 15 m/day.

17. The method of claim 14, wherein the electron acceptor comprises nitrate.

18. The method of claim 14, wherein the concentration of the source of vitamins in the substance is in the range of 1 to 1000 $\mu g/l$.

19. The method of claim 14, wherein substantially no oxygen is supplied with the substance for promoting microbial growth.

20. The method of claim 14, wherein the step for creating a biomass layer in the formation comprises allowing bacteria selected from the group consisting of anaerobic and facultative anaerobic bacteria to multiply using the oil as their main carbon source.

21. The method of claim 20, wherein the bacteria are already present in the formation.

22. The method of claim 20, wherein the bacteria are introduced simultaneously with the substance for promoting microbial growth.

23. The method of claim 20, wherein the bacteria include at least one species selected from the group consisting of sulphate reducing bacteria, nitrate reducing bacteria, iron reducing bacteria and acetogenic bacteria.

24. A method of microbial enhanced oil recovery for recovering oil from an oil-bearing rock formation, the formation including an inlet and at least one outlet, the method comprising:

injecting water containing a source of vitamins, phosphates and an electron acceptor into the formation;

allowing micro-organisms selected from the group consisting of anaerobic and facultative anaerobic bacteria to multiply using the oil as their main carbon source, thereby establishing a biomass layer which acts to dissociate the oil from the rock formation; and removing the dissociated oil via the at least one outlet, wherein the source of vitamins comprises vitamins selected from the group consisting of B12, biotin, folic acid, nicotinic acid, aminobenzoic acid, calcium pantothenate, pyridoxine HCL, riboflavin, thiamine and thioctic acid.

25. A method as claimed in claim 24, in which substantially no oxygen is supplied with the injection water.

26. A method as claimed in claim 24, in which the concentration of the source of vitamins in the injection water is in the range of 1 to 1000 $\mu$g/l.

27. A method as claimed in claim 24, in which the superficial velocity of the injection water through the oil-bearing formation is between 0.1 and 15 m/day.

28. A method as claimed in claim 24, in which the micro-organisms produce surfactants which act to dislodge the oil.

29. The method of claim 24, wherein the micro-organisms include at least one species selected from the group consisting of sulphate reducing bacteria, nitrate reducing bacteria, iron reducing bacteria and acetogenic bacteria.

30. A method of microbial enhanced oil recovery for recovering oil from an oil bearing rock formation, the method comprising:

a step for supplying a substance for promoting microbial growth to the formation;

a step for creating a biomass layer in the formation for dissociating oil from the formation; and a step for removing the dissociated oil from the formation, wherein the substance for promoting microbial growth comprises water, a source of vitamins, a source of phosphates, and an electron acceptor, and wherein the step for creating a biomass layer in the formation comprises allowing bacteria selected from the group consisting of anaerobic and facultative anaerobic bacteria to multiply using the oil as their main carbon source, and wherein the bacteria include at least one species selected from the group consisting of sulphate reducing bacteria, nitrate reducing bacteria, iron reducing bacteria and acetogenic bacteria.

31. A method as claimed in claim 30, in which substantially no oxygen is supplied with the injection water.

32. A method as claimed in claim 30, in which the concentration of the source of vitamins in the injection water is in the range of 1 to 1000 $\mu$g/l.

33. A method as claimed in claim 30, in which the superficial velocity of the injection water through the oil-bearing formation is between 0.1 and 15 m/day.

34. A method as claimed in claim 30, in which the bacteria produce surfactants which act to dislodge the oil.

35. A method as claimed in claim 30, wherein the source of vitamins comprises vitamins selected from the group consisting of B12, biotin, folic acid, nicotinic acid, aminobenzoic acid, calcium pantothenate, pyridoxine HCL, riboflavin, thiamine and thioctic acid.

36. A method of microbial enhanced oil recovery for recovering oil from an oil-bearing rock formation, the formation including an inlet and at least one outlet, the method comprising:

injecting water containing a source of vitamins, phosphates and an electron acceptor into the formation;

allowing micro-organisms selected from the group consisting of anaerobic and facultative anaerobic bacteria to multiply using the oil as their main carbon source, thereby establishing a biomass layer which acts to dissociate the oil from the rock formation; and removing the dissociated oil via the at least one outlet, wherein substantially no oxygen is supplied with the injection water.

37. A method as claimed in claim 36, in which the concentration of the source of vitamins in the injection water is in the range of 1 to 1000 $\mu$g/l.

38. A method as claimed in claim 36, in which the superficial velocity of the injection water through the oil-bearing formation is between 0.1 and 15 m/day.

39. A method as claimed in claim 36, in which the micro-organisms produce surfactants which act to dislodge the oil.

40. A method as claimed in claim 36, wherein the source of vitamins comprises vitamins selected from the group consisting of B12, biotin, folic acid, nicotinic acid, aminobenzoic acid, calcium pantothenate, pyridoxine HCL, riboflavin, thiamine and thioctic acid.

41. The method of claim 36, wherein the micro-organisms include at least one species selected from the group consisting of sulphate reducing bacteria, nitrate reducing bacteria, iron reducing bacteria and acetogenic bacteria.

42. A method of microbial enhanced oil recovery for recovering oil from an oil bearing rock formation, the method comprising:

a step for supplying a substance for promoting microbial growth to the formation;

a step for creating a biomass layer in the formation for dissociating oil from the formation; and a step for removing the dissociated oil from the formation, wherein the substance for promoting microbial growth comprises water, a source of vitamins, a source of phosphates, and an electron acceptor, wherein substantially no oxygen is supplied with the substance for promoting microbial growth.

43. A method as claimed in claim 42, in which the concentration of the source of vitamins in the injection water is in the range of 1 to 1000 $\mu$g/l.

44. A method as claimed in claim 42, in which the superficial velocity of the injection water through the oil-bearing formation is between 0.1 and 15 m/day.

45. A method as claimed in claim 42, in which the bacteria produce surfactants which act to dislodge the oil.

46. A method as claimed in claim 42, wherein the source of vitamins comprises vitamins selected from the group consisting of B12, biotin, folic acid, nicotinic acid, aminobenzoic acid, calcium pantothenate, pyridoxine HCL, riboflavin, thiamine and thioctic acid.

47. The method of claim 42, wherein the micro-organisms include at least one species selected from the group consisting of sulphate reducing bacteria, nitrate reducing bacteria, iron reducing bacteria and acetogenic bacteria.

* * * * *